United States Patent
Liu et al.

(10) Patent No.: US 8,020,456 B2
(45) Date of Patent: Sep. 20, 2011

(54) SENSOR AND A METHOD OF MAKING A SENSOR

(75) Inventors: Tao Liu, Tallahassee, FL (US); Chun Zhang, Tallahassee, FL (US); Ben Wang, Tallahassee, FL (US); Zhiyong Liang, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 177 days.

(21) Appl. No.: 12/471,903

(22) Filed: May 26, 2009

(65) Prior Publication Data

US 2009/0309172 A1 Dec. 17, 2009

Related U.S. Application Data

(60) Provisional application No. 61/057,353, filed on May 30, 2008.

(51) Int. Cl.
*G01L 1/04* (2006.01)
*G01L 1/20* (2006.01)
*G01L 1/22* (2006.01)

(52) U.S. Cl. ............. 73/862.621; 7/862.625; 7/862.628; 7/862.632; 7/862.637

(58) Field of Classification Search ............. 73/862.621, 73/862.625, 862.628, 862.632, 862.637
See application file for complete search history.

(56) References Cited

U.S. PATENT DOCUMENTS

| | | | |
|---|---|---|---|
| 4,562,033 A | 12/1985 | Johnson et al. | |
| 6,036,857 A | 3/2000 | Chen et al. | |
| 6,569,937 B2 | 5/2003 | Foulger et al. | |
| 6,683,783 B1 | 1/2004 | Smalley et al. | |
| 6,723,299 B1 | 4/2004 | Chen et al. | |
| 6,741,019 B1 | 5/2004 | Filas et al. | |
| 7,105,596 B2 | 9/2006 | Smalley et al. | |
| 7,244,407 B2 | 7/2007 | Chen et al. | |
| 7,459,121 B2 | 12/2008 | Liang et al. | |
| 2001/0051272 A1 | 12/2001 | Toyoda et al. | |
| 2002/0094311 A1 | 7/2002 | Smalley et al. | |
| 2005/0154116 A1 | 7/2005 | Nagy et al. | |
| 2005/0239948 A1 | 10/2005 | Haik et al. | |
| 2006/0017191 A1 | 1/2006 | Liang et al. | |
| 2006/0166003 A1 | 7/2006 | Khabashesku et al. | |
| 2007/0176319 A1 | 8/2007 | Thostenson et al. | |
| 2008/0057265 A1 | 3/2008 | Liang et al. | |
| 2008/0229839 A1* | 9/2008 | Chakraborty | 73/724 |
| 2008/0280115 A1 | 11/2008 | Liang et al. | |

OTHER PUBLICATIONS

U.S. Appl. No. 11/459,171, filed Jul. 21, 2006, Wang, et al.
U.S. Appl. No. 11/749,302, filed May 16, 2007, Liang, et al.
Ajayan, et al., "Aligned Carbon Nanotube Arrays Formed by Cutting a Polymer Resin-Nanotube Composite," Science, vol. 265, pp. 1212-1214 (1994).

(Continued)

*Primary Examiner* — Evan Pert
(74) *Attorney, Agent, or Firm* — Sutherland Asbill & Brennan LLP

(57) ABSTRACT

A sensor is provided, which includes a plurality of conducting elements spaced apart from each other and at least one deformable electrolyte bridge contacting each of the conducting elements at one or more contact points having an aggregate contact area. Upon formation of an ionic circuit between two of the conducting elements, a first resistivity between the two conducting element exists. Upon application of a compressive force on the at least one deformable electrolyte bridge directed toward at least one of the conducting elements, the aggregate contact area increases such that a second resistivity between the two conducting elements exists.

24 Claims, 7 Drawing Sheets

OTHER PUBLICATIONS

Ajayan, et all, "Single-Walled Carbon Nanotube-Polymer Composites: Strength and Weakness," Advanced Materials 12:750-753 (2000).

Andrews, et al., "Nanotube composite carbon fibers," Applied Physics Letters, 75(9): pp. 1329-1331 (1999).

Chauvet, et al., "Magnetic anisotropies of aligned carbon nanotubes," The American Physical Society, 52(10): pp. 6963-6966 (1995).

Chen, et al., "Electrochemical synthesis of polypyrrole/carbon nanotube nanoscale composites using well-aligned carbon nanotube arrays," Applied Physics A, vol. 73, pp. 129-131 (2001).

Cho, et al., "Carbon nanotube synthesis using a magnetic field via thermal chemical vapor deposition," Journal of Crystal Growth 243, 2002, pp. 224-229.

Cooper, et al., "Distribution and Alignment of Carbon Nanotubes and Nanofibrils in a Polymer Matrix," Composites Science and Technology 62:1105-1112 (2002).

Dai, Title: "Carbon Nanotubes Opportunities and Challenges," Surface Science 500 (2002), pp. 218-241.

de Heer, et al., "Aligned Carbon Nanotube Films: Production and Optical and Electronic Properties," Science 268:845-847 (1995).

Dresselhaus, et al., "Synthesis of Graphite Fibers and Filaments," M. Cardon, Ed., pp. 12-34 (1988).

Durgun, E., et al., "Systematic study of adsorption of single atoms on a carbon nanotube," Physical Review B 67, 201401R 2003, pp. 1-4.

Endo, et al., Title: "Buckypaper from Coaxial Nanotubes," Nature/ vol. 433/Feb. 3, 2005/www.nature.com/nature; pp. 476.

Fan, et al., "Self-Oriented Regular Arrays of Carbon Nanotubes and Their Field Emission Properties," Science 283:512-514 (1999).

Fugiwara, et al., "Magnetic Orientation and Magnetic Properties of a Single Carbon Nanotube," The Journal of Physical Chemistry, 105(18): pp. 4383-4386 (2001).

Garg, et al., "Effect of chemical functionalization on the mechanical properties of carbon nanotubes," Chemical Physics Letters, 295(4): pp. 273-278 (1998). Abstract.

Gou, et al., "Experimental Design and Optimization of Dispersion Process for Single-Walled Carbon Nanotube Bucky Paper," International Journal of Nanoscience, 3(3), 293-307, (2004).

Gou, et al., Title: "Development of Nanotube Bucky Paper/Epoxy Nanocomposites," Proceedings of the TEXCOMP-6 International Symposium on textile Composites, Sep. 11-13, 2002, pp. 1-5.

Gou, et al., Title: "Process Analysis and Optimization of SWNT Bucky Paper Reinforce Epoxy Composites," Proceedings of the 48th International Society for Advancement of Material Process Engineering (SAMPE) Symposium and Exhibition, Long Beach, CA May 12-14, 2003, pp. 1-12.

Haggenmueller, et al., "Aligned single-wall carbon nanotubes in composites by melt processing methods," Chemical Physics Letters 330, Nov. 10, 2000, pp. 219-225.

Hertel, et al., "Deformation of Carbon Nanotubes by Surface van der Weals Forces," Physical Review B. 58:13870-13873 (1998).

Holloway, et al., "Texture Development Due to Preferential Grain Growth of Ho-Ba-Cu-O in 1.6-T Magnetic Field," J. Mat. Res. 8:727-733 (1993).

I-CubeX Online Store—SlideWide v. 1.1: Position sensor, pp. 1-3 (http://infusionsystems.com/catalog/product-info.php/products_id/72).

I-CubeX Online Store: Sensors, Actuators, Interfaces, Software and Accessories, pp. 1-10 (http://infusionsystems.com/catalog/all_products.php).

Kimura, et al., "Polymer Composites of Carbon Nanotubes Aligned by a Magnetic Field," Advanced Materials, v14 No. 19, Oct. 2, 2002, pp. 1380-1383.

Knez, et al., "Electrochemical modification of individual nano-objects," Journal of Electroanalytical Chemistry, vol. 522: pp. 70-74 (2002).

Knite, M., et al., "Polyisoprene—multi-wall carbon nanotube composites for sensing strain," Materials Science and Engineering C 27 (2007) 1125-1128.

Kumar, et al., "Fibers from Polypropylene/Nano Carbon Fiber Composites," polymer 43:1701-1703 (2002).

Kyotani, et al., "Preparation of Ultrafine Carbon Tubes in Nanochannels of an Anodic Aluminum Oxide Film," Chem. Mater. 8:2109-2113 (1996).

Li, et al., "Large-Scale Synthesis of Aligned Carbon Nanotubes," Science 274:1701-1703 (1996).

Li, Yan-Hui, et al., "Adsoprtion of cadmium(II) from aqueous solution by surface oxidized carbon nanotubes," Carbon 41 (2003), pp. 1057-1062.

Liang, et al., Molecular Dynamic Simulation and Experimental Investigation of Filling Chopped SWNTS with Resin Matrix Molecules to Enhance Interfacial Bonding and Loading Transfer in Nanocomposites, SAMPE 2004, Long Beach, CA , May 16-24, 2004, pp. 1-8.

Lourie, et al., "Evaluation of Young's modulus of carbon nanotubes by micro-Raman spectroscopy," Journal of Materials Research, 13(9): pp. 2418-2422 (1998).

McLachlan, David S., et al, "AC and DC Percolative Conductivity of Single Wall Carbon Nanotube Polymer Composites," Journal of Polymer Science: Part B: Polymer Physics, vol. 43, 3273-3287 (2005).

Ni, et al., "Chemical Functionalization of Carbon Nanotubes through Energetic Radical Collisions," Physical Review B. 61:R16343-R16346 (2000).

Qian, et al., "Load transfer and deformation mechanism in carbon nanotube-polystyrene composites," Applied Physics Letters, 76(20): pp. 2868-2870 (2000).

Raymundo-Piñero, et al., "High surface area carbon nanotubes prepared by chemical activation," Carbon 40 (2002), pp. 1597-1617.

Sinclair, Stephen, "A guitar-inspired tough-pad controller," Music Technology Area, Schulich School of Music, McGill University, 555 Sherbrook W. Montreal, Québec, Canada (www.music.mcgill.ca/nsinclair/touchpad-guitar_sinclair.pdf).

Sinha, Niraj, et al., "Carbon Nanotube-Based Sensors," Journal of Nanoscience and Nanotechnology, 2006, vol. 6, pp. 573-590.

Smith, et al., "Structural anisotropy of magnetically aligned single wall carbon nanotube films," Applied Physics Letters (77(5): pp. 663-665 (2000).

Stéphan, et al., "Characterization of singlewalled carbon nanotubes-PMMA composites," Synthetic metals, 108(2): pp. 139-149 (2000). Abstract.

Thostenson, et al., "Advances in the science and technology of carbon nanotubes and their composites: a review," Composites Science and Technology 61, 2001, pp. 1899-1912.

Thostenson, et al., "Nanocomposites in context," Composites Science and Technology 65:491-516 (2005).

Treacy, et al., "Exceptionally High Young's Modulus Observed for Individual Carbon Nanotubes," Nature 381:678-680 (1996).

Velasco-Santos, et al., "Chemical Functionalization of Carbon Nanotubes through an Organosilane," Nanotechnology 13:495-498 (2000).

Velasco-Santos, et al., "Chemical functionalization of carbon nanotubes through an organosilane," Nanotechnology, vol. 13, pp. 495-498 (2002). Abstract.

Wang, et al., "Growth and characterization of buckybundles," Applied Physics Letters, 62(16): pp. 1881-1883 (1993).

Wang, et al., Title: "Fabrication and Characterization of In-Plane Aligned Nanotube Composites with Magnetically Aligned Carbon Nanotube Bucky Papers," Proc. 14th Int. Conf. on Composite Materials (ICCM-14), 1 (San Diego, CA, Jul. 14-18, 2003) pp. 1-7.

Wikipedia, Title: "Carbon Nanotube," Date: Jan. 9, 2006, pp. 1-7.

Wood, et al., "Orientation of Carbon Nanotubes in Polymers and its Detection by Raman Spectroscopy," Composites: Part A 32:391-399 (2001).

Wu, et al., "Deposition of Nanotube Composites using Matrix-Assisted Pulsed Laser Evaporation," Materials Research Society Symposium, vol. 617, 2000, pp. J2.3.1-6.

Zhang, W., et al., "Carbon nanotube/polycarbonate composites as multifunctional strain sensors," Journal of nanoscience and nanotechnology ISSN 1533-4880, 2006, vol. 6, No. 4, pp. 960-964.

* cited by examiner

SENSOR AND A METHOD OF MAKING A SENSOR

CROSS-REFERENCE TO RELATED APPLICATION

This application claims benefit of U.S. Provisional Application No. 61/057,353, filed May 30, 2008, which is incorporated herein by reference.

BACKGROUND OF THE INVENTION

This invention relates generally to sensors, and more particularly to pressure sensors including an ionic conduction sensing mechanism.

Pressure sensing technologies, or force sensing technologies, have a broad range of applications in the medical, industrial, and consumer product arenas. For various applications, sensors desirably may have different pressure sensing characteristics such as working ranges, interfaces, operating conditions, shape, size, and materials. Although a large number of pressure sensors are commercially available, the types of flexible thin film pressure sensors have been relatively limited. Flexible thin film pressure sensors typically may be used to measure the interface pressure and pressure distribution between objects (e.g., relatively soft objects), and have certain applications in which conformal bending of the sensor to the interface may be required (e.g., seat occupancy detection in the automobile industry, tactile feedback for robots to sense and respond to environments, rehabilitation progress monitoring of a patient in the medical industry, biting force mapping in dentistry applications, or force measurement on golf club grips).

Thin film pressure sensors conventionally use sensing methods that are either resistive or capacitive (see, e.g., Ashruf, C. M. A., "Thin Flexible Pressure Sensors", *Sensor Review*, 22, 322-327, 2002). The resistive sensing principle may be based on resistance change of thin film sensing elements when a compressive force or pressure is applied to the sensing elements. The detailed design of a resistive sensor may vary from one sensor to another. One example of a resistive thin film pressure sensor is FLEXIFORCE® from Tekscan Inc. FLEXIFORCE® may consist of two polymer films. One film has electrodes facing the conductive surface of the adjacent film, and both of films have conductive materials and pressure-sensitive inks. When pressure is applied to such a sensor, the contact resistance between the two adjacent polymer films changes and is detected. In contrast, capacitive thin film pressure sensors may rely on a capacitance change due to a gap distance change between two plates when pressure is applied to the sensor. Thin film pressure sensors based on either resistive or capacitive principle may be re-usable.

Another pressure sensor is a disposable thin film pressure mapping product called PRESSUREX®, which is offered by Sensor Products Inc. PRESSUREX® utilizes rupture of microcapsules encapsulated with dyes for pressure sensing (See PRESSUREX® brochure, Sensor Products Inc., at www.sensorprod.com).

Other pressure sensors may use conducting material-filled polymer to detect pressure. Conducting material-filled polymer has variable conductivity, which originates from a process known as percolative conduction. Briefly, percolative conduction involves the conducting material-filled polymers undergoing an insulating-conducting transition when the volume fraction of the conducting filler in the polymer matrix exceeds a threshold value. When conventional conducting fillers, such as carbon black and metallic powders, are used, a relatively large volume fraction is required (i.e., about 15 vol. %) to cause percolative conduction. Such a high volume fraction generally makes processing very difficult due to an increase in the viscosity of the polymer filled with conducting material. Although those conducting material filler-polymers have a high percolation threshold, a lower percolation threshold (e.g., 3 wt. %) has been reported for other conducting material filled-polymer materials, such as a carbon nanotube-filled polycarbonate used for strain sensing. (See, e.g., Barrau S. et al., *Macromolecules*, 36, 5187-5194, 2003 and Zhang, W. et al., *Nanoscience and Nanotechnology*, 6, 960-964, 2006).

It would therefore be desirable to provide additional sensors capable of sensing low pressures which also may have enhanced sensitivity for sensing low pressures.

SUMMARY OF THE INVENTION

Sensors are provided for detecting the presence, intensity, and/or location of a compressive force, or pressure. In certain embodiments, a thin film sensor is provided for measuring pressure or mechanical displacement. The sensor comprises a first substrate having a load receiving side and an opposed conducting element side, a plurality of conducting elements located on the first substrate at the conducting element side in positions spaced apart from one another, a deformable second substrate located on the conducting element side of the first substrate, and at least one deformable electrolyte bridge located on the deformable second substrate and contacting each of the conducting elements at one or more contact points. The contact points having an aggregate contact area. Upon formation of an ionic circuit between two of the conducting elements, a first resistivity exists between the two conducting elements when the first substrate is in an unloaded state at a location at or about the two conducting elements. A second resistivity exists between the two conducting elements when the first substrate is in a loaded state at the location at or about the two conducting elements and the deformable electrolyte bridge is deformed at or about said location in an amount to increase the aggregate contact area. The difference between the first and second resistivities can be correlated with the pressure or mechanical displacement to be measured.

In one embodiment, the sensor further comprises means for forming an ionic circuit between two of the conducting elements. In certain embodiments, the conducting elements are elongated and parallel to one another.

In one embodiment, wherein the conducting elements comprise nanoscale fibers. In another embodiment, the conducting elements comprise nanoscale fiber films.

In certain embodiments, the deformable electrolyte bridge is elastically deformable. In one embodiment, the first substrate comprises a polymer and the conducting elements comprise metalized structures disposed on the first substrate.

In another aspect, the sensor is provided comprising a plurality of conducting elements spaced apart from each other and at least one deformable electrolyte bridge contacting each of the conducting elements at one or more contact points having an aggregate contact area. Upon formation of an ionic circuit between two of the conducting elements, a first resistivity exists between the two conducting element. Upon application of a compressive force on the at least one deformable electrolyte bridge directed toward at least one of the conducting elements, the aggregate contact area increases such that a second resistivity exists between the two conducting elements. The difference between the first and second resistivities can be correlated with the applied compressive force.

In a particular embodiment, the deformable electrolyte bridge comprises an arched surface having arch ends contacting each of the conducting elements such that an upper portion of the arched surface is spaced apart from the conducting elements. Upon application of the compressive force, the upper portion of the arched surface contacts at least one of the conducting elements.

In certain embodiments, the conducting elements comprise a plurality of conducting element strips positioned parallel to each other, and the deformable electrolyte bridge comprises a plurality of deformable electrolyte bridges positioned parallel to each other and traverse to the conducting element strips.

In one embodiment, the sensor further comprises a substrate adjacent to the conducting elements. The substrate is also spaced apart from the at least one deformable electrolyte bridge.

In certain embodiments, the sensor further comprises a deformable material adjacent to the conducting elements, the deformable electrolyte bridge, or both.

In one embodiment, the deformable electrolyte bridge comprises a polyacrylate salt.

In yet another aspect, a method is provided for making a sensor. In certain embodiments, the method comprises disposing a plurality of conducting elements at positions spaced apart from each other and applying at least one deformable electrolyte bridge onto the conducting elements at one or more contact points having an aggregate contact area. Upon formation of an ionic circuit between two of the conducting elements, a first resistivity exists between the two conducting element. Upon application of a compressive force on the at least one deformable electrolyte bridge directed toward at least one of the conducting elements, the aggregate contact area increases such that a second resistivity exists between the two conducting elements.

In one embodiment, the conducting elements are provided by cutting and removing the conducting elements from a conducting material with a patterned stamp.

In certain embodiments, the method further comprises disposing a deformable material on the conducting elements, the electrolyte bridges, or both. In one embodiment, the steps of disposing the deformable electrolyte bridge and disposing the deformable material comprise providing a deformable material including grooves, disposing a plurality of deformable electrolyte bridges in the grooves, and disposing the deformable material with the deformable electrolyte bridges in the grooves onto the conducting elements.

In still another aspect, a method is provided for sensing pressure comprising locating a sensor at a site where it is desired to sense a pressure change and then using the sensor to identify a pressure or pressure change. The sensor comprises a plurality of conducting elements spaced apart from each other and at least one deformable electrolyte bridge contacting each of the conducting elements at one or more contact points having an aggregate contact area. The method also comprises forming of an ionic circuit between two of the conducting elements and measuring a first resistivity between the two conducting elements. Upon application of a compressive force on the deformable electrolyte bridge directed toward at least one of the conducting elements to cause a change in the aggregate contact area, the method further comprises measuring a second resistivity between the two conducting elements and then comparing the first and second resistivity to identify a pressure or pressure change at the site.

In yet another aspect, a sensor is provided which includes a deformable composite material and a plurality of nanoscale fibers dispersed within the deformable composite material. Upon formation of a circuit between two discrete points on the sensor, a first resistivity exists between the two discrete points. Upon application of a compressive force on the sensor, a second resistivity is generated between the two discrete points. The difference between the first resistivity and second resistivity indicates the magnitude of pressure applied to the sensor.

DETAILED DESCRIPTION OF THE INVENTION

Figure 1A:
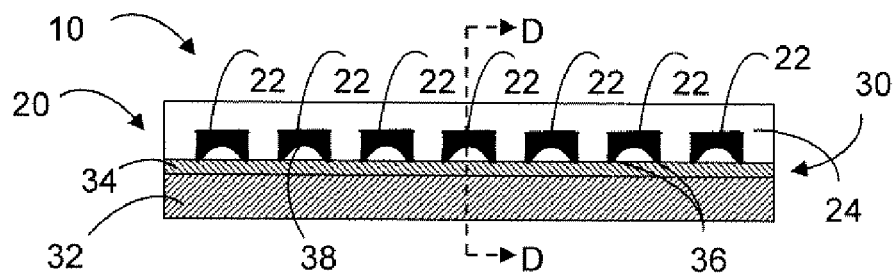
FIG. 1A is a side view of one embodiment of the sensor.
Figure 1B:
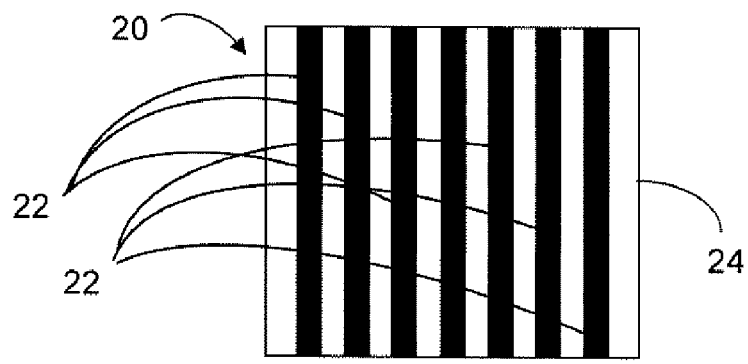
FIG. 1B illustrates a bottom view of a top portion of one embodiment of the sensor.

Thin film sensors, or sensing assemblies, have been developed for detecting the presence, intensity, and/or location of a compressive force, or pressure, for example, via a mechanical displacement. In certain embodiments, the sensors utilize ionic conduction as a sensing mechanism to sense low pressures. The sensors may include a broad range of materials (e.g., polymers, polymer gels, and ceramics) for producing an ionic circuit. Such design flexibility results in some sensors, which may include a variety of materials, having the ability to measure a large range of applied pressures. In addition, the conductivity and/or resistivity of ionic conduction based pressure sensors may be adjusted by changing the concentration of the ionic charge carriers in the sensing elements. Thus, the choice of the materials used in the sensors may be tailored to provide suitable mechanical properties (e.g., stiffness) and sensitivity of the sensors for particular applications. In some embodiments, the sensors detect pressures ranging from about 1 psi to about 1,000 psi. In preferred embodiments, the sensors use nanoscale fibers in an electronic conduction variation or percolative conduction sensing mechanism to sense pressure. Methods for fabricating pressure sensors also have been developed.

In certain embodiments, the sensor includes a plurality of conducting elements spaced apart from each other and at least one deformable electrolyte bridge contacting each of the conducting elements at one or more contact points having an aggregate contact area. Upon application of a voltage or a current (i.e., forming an ionic circuit) between two of the conducting elements, a first resistivity between the two conducting element exists. Upon application of a compressive force on the at least one deformable electrolyte bridge directed toward at least one of the conducting elements, the aggregate contact area increases such that a second (different) resistivity between the two conducting elements is created. The resistance delta correlates with a change in pressure.

In one embodiment, nanoscale fiber-filled polymer matrixes are used for sensing pressures. Upon application of pressure, the polymer matrix deforms and causes local redistribution of the nanotubes, which induces a resistance change between two points on the nanotube filled-polymer matrix for electrical sensing. In one embodiment, carbon nanotube-filled epoxy and polycarbonate composite films may be used to sense higher pressures owing to high modulus of the polymer matrix. For example, the sensors may detect pressures ranging from about 100 psi to about 10,000 psi. Without being bound by any theory, these resistive pressure sensors depend upon electronic conduction variation of an applied circuit when pressure is applied on the sensing elements. However, the carbon nanotube-filled polymer (e.g., epoxy) systems may have a percolation threshold value as low as about 0.3 wt %.

In some embodiments, the sensors may use both electronic and ionic conduction (e.g., a hybrid conducting mechanism). For example, nanoscale fibers could be incorporated into an ionic conducting polymer gel electrolyte bridge. Such hybrid conducting mechanisms may allow the sensors to operate in a larger pressure range.

As used herein, the terms "comprise," "comprising," "include," and "including" are intended to be open, non-limiting terms, unless the contrary is expressly indicated.

The Sensors

In certain embodiments, the sensor includes a substrate, a plurality of conducting elements, a plurality of deformable electrolyte bridges contacting each of the conducting elements at one or more contact points, and a deformable material adjacent to the conducting elements and the deformable electrolyte bridges. As used herein, the "deformable material" may also be referred to as a "deformable second substrate", so that the "substrate" may also be referred to as a "first substrate." FIGS. 1A-D illustrate such an embodiment of the sensor 10. The sensor 10 is composed of a top portion 20 and a bottom portion 30. The bottom portion 30 of the sensor 10 comprises a substrate 32 and a plurality of conducting elements 34 disposed on a first surface (i.e., conducting element side) of the substrate, opposite a load receiving side of the substrate.

Suitable materials for use as the substrate in various embodiments of the sensor include polyethylene terephthalate (PET), polypropylene (PP), polyimide, polybutylene terephthalate (PBT), polyethylene naphthalate (PEN), polymethyl methacrylate (PMMA), polyvinyl alcohol (PVA), cyclic polyolephins, polyethylene (PE), polycarbonate (PC), a combination thereof, or any other materials which are compatible for use with the conducting elements. In certain embodiments, the substrate comprises a flexible, deformable, resilient, or elastomeric thin film material.

Figure 1C:
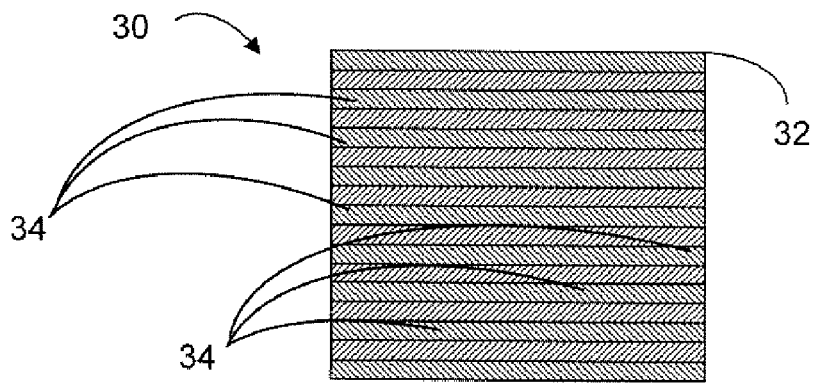
FIG. 1C is a top view of a bottom portion of one embodiment of the sensor.
Figure 2:
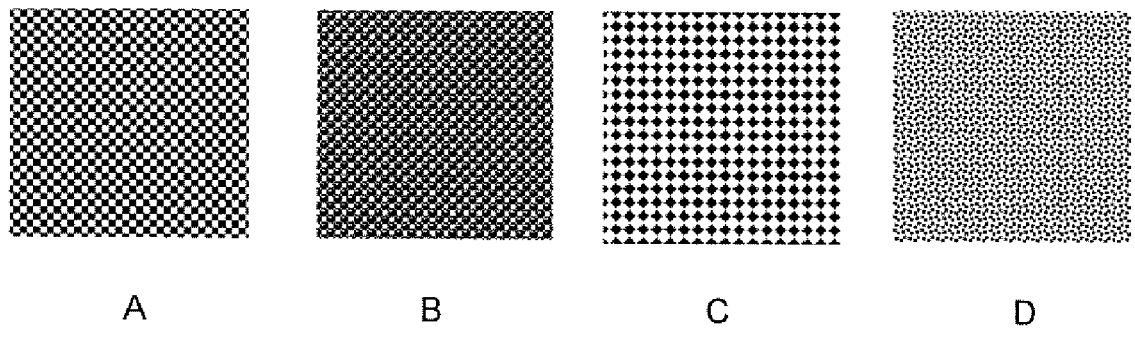
FIG. 2 illustrates various patterns in which embodiments of the conducting elements may be positioned.

As illustrated in FIG. 1C, the conducting elements 34 are nine thin film strips spaced apart from each other. However, it should be understood that the sensor may include any number of conducting elements greater than one, having essentially any shape, and positioned in any pattern such that they are spaced apart from each other. FIG. 2 illustrates patterns in which exemplary embodiments of the conducting elements are positioned. The conducting elements may comprise nanoscale fibers (e.g., multi-wall carbon nanotubes), nanoscale fiber films (e.g., single-walled carbon tube thin films), indium tin oxide (ITO), conducting polymers, metals (e.g., gold or copper), aluminum doped zinc oxides (AZO) a combination thereof, or any material compatible for use as ionic conduction components. In some embodiments, nanoscale fiber thin films, such as carbon nanotube films, may be advantageous for use in the conducting elements because of their mechanical robustness, high electrical conductivity, and transparent characteristics.

In one embodiment, the conducting elements comprise a metalized film (e.g., metal coating) structure on the substrate. In particular, the metalized film may be patterned to form conducting elements spaced apart from each other. As used herein, "metalized" means coated, impregnated, or otherwise combined with a metal. Examples of suitable metals which may be used to metalize the substrate include gold, copper, silver, aluminum, or a combination thereof.

Figure 1D:
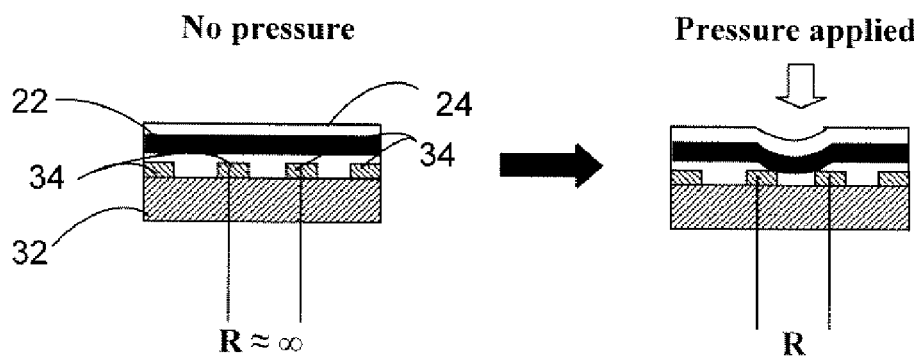
FIG. 1D is cross-sectional side view of a portion of one embodiment of the sensor, with no pressure applied and with a pressure applied to the sensor.

The top portion 20 of the sensor 10 comprises deformable electrolyte bridges 22 contacting the conducting elements 34. The deformable electrolyte bridges 22 are separated from and distal to the substrate 32. As shown in FIG. 1C, the deformable electrolyte bridges 22 contact each of the conducting elements 34 at one or more contact points 36. Thus, the conducting element strips 34 are positioned parallel to each other, and the deformable electrolyte bridges 22 are positioned parallel to each other and traverse to the conducting element strips. For each deformable electrolyte bridge 22, the contact points 36 with each conducting element 34 have an aggregate contact area. Each deformable electrolyte bridge 22 has two contact points 36 with each conducting element 34 when no compressive force is applied. Specifically, the deformable electrolyte bridges 22 comprises an arched surface 38 having arch ends contacting each of the conducting elements 34 such that an upper portion of the arched surface is spaced apart from the conducting elements. As shown in FIG. 1D, upon application of the compressive force, the upper portion of the arched surface 38 contacts two conducting elements 34. Thus, the resistivity between those two conducting elements decreases upon application of the compressive force.

As illustrated in FIG. 1, the sensor 10 includes seven electrolyte bridges 22 having arched surfaces 38. However, it should be understood that various embodiments of the sensor include any number of deformable electrolyte bridges having any configuration or shape for contacting and connecting at least two of the conducting elements such that an ionic circuit between the two conducting elements is created and the resistivity between the two conducting elements changes as the deformable electrolyte bridge is compressed toward at least one of the conducting elements. For example, the deformable electrolyte bridges may have a round shape, a diamond shape, or a cross shape.

Suitable electrolytes for use in embodiments of the deformable electrolyte bridges include polymer gel electrolytes (e.g., poly(ethylene glycol diglycidyl ether) (PEGDE) mixed with ethylenimine (EI) oligomer mixture, lithium trifluoromethanesulfonate (LiTf), and dimehylformamide (DMF)), polymeric electrolytes (e.g., sodium polyacrylate or other polyacrylate salts), polymer electrolyte solutions, organic and inorganic salts (e.g., LiTf, lithium perchlorate (LiClO$_4$), lithium tetrafluoroborate (LiBF$_4$)) dissolved in NMP/PVA formed polymer gels, organic salts dissolved in THF/PVDF formed polymer gels, organic and inorganic salts dissolved in DMF/PAN formed polymer gels, and combinations thereof, or any other materials which are compatible for use as ionic conduction components and may be deformed or flexed under the compressive force to be sensed or measured.

The top portion 20 of the sensor 10 comprises a deformable material 24 disposed on the deformable electrolyte bridges 22. Suitable deformable materials for use in embodiments of the sensor include elastomer-like polymer materials, such as polydimethyl siloxane (PDMS) (e.g., Sylgard-184), natural rubbers, polyisoprene rubbers, butyl rubber, halobutyl rubber, ethylene-propylene-diene monomer elastomers (EPDM), styrene-butadiene elastomers, vinylidene fluoride-hexafluoropropylene elastomers, or any other deformable or flexible material compatible for use with the electrolyte bridges and the conducting elements. For instance, the deformable material may be essentially any material that allows a compressive force directed onto the deformable material to be transferred to the electrolyte bridges and/or that protects the electrolyte bridges, the conducting elements, or both from external forces which may damage them. In particular embodiments, the deformable material is patterned with a surface topography (e.g., alternate elevated and grooved regions as shown in FIG. 1C) to compliment the topography of the one or more electrolyte bridges. In the embodiment illustrated in FIG. 1, the grooved region is configured so that the height of the deformable electrolyte bridges 22 in the grooved region does not exceed the height of the elevated regions of the deformable material 24.

As shown in FIG. 1D, without pressure applied to the sensing assembly 10 (i.e., an unloaded state), resistance between any two conducting elements 34 is very high or approaches infinity. For example, in one embodiment, the resistivity between two conducting elements 22 is greater than about 100 Mohm. Upon application of a compressive force (i.e., a loaded state), local deformation of the deformable material 24 of the top portion of the sensor 10 causes one or more electrolyte bridges 22 to bend or deform and come into greater contact with one or more thin film strip conducting elements 34 to create an ionic conducting path. For instance, in one embodiment, the resistivity between two conducting elements upon application of a compressive force ranges from about 10 Mohm and about 65 Mohm. Thus, the contact area between one or more electrolyte bridges 22 and one or more conducting elements 34 increases and reduced resistance is detected between the thin film strip conducting elements proximate the portion of the sensor where the compressive force is applied.

The greater the compressive force applied, the larger is the deformation of the deformable material and the one or more electrolyte bridges. Therefore, the larger the contact area created between the electrolyte bridges and the thin film strip conducting elements is, the smaller the resistance is detected. The geometric parameters of the sensor (e.g., total thickness, thickness of the electrolyte bridges, distance between each electrolyte bridge, width of the electrolyte bridges) may be adjusted to provide the desired overall performance, e.g., the sensitivity and sensing ranges, of the sensor. The mechanical properties of the electrolyte bridges and the deformable material are also factors which determine the sensing performance.

The shape and configuration patterns of the electrolyte bridges and conducting elements shown in the embodiment of FIG. 1 are used to demonstrate the concept of the pressure senor. In other embodiments, different shapes patterns are also be used in the sensors.

In certain embodiments, the sensors are be reusable and includes elastically deformable electrolyte bridges and a elastically deformable second substrate. In one embodiment, the sensor is disposable. For instance, the sensor may include deformable electrolyte bridges which is not elastically deformable and/or a deformable material which are not elastically deformable (e.g., in a single use sensor).

In certain embodiments, the sensors include a means for forming an ionic circuit or leads for attachment of a device for measuring the change in resistivity, such as an ohmmeter or the like. In one embodiment, the means for forming an ionic circuit comprises a current source, a voltmeter, ionic sensing elements, electrical leads, or a combination thereof. In another embodiment, the means for forming an ionic circuit comprises a frequency response analyzer for AC impedance measurement, ionic sensing elements, electrical leads, or a combination thereof.

In alternate embodiments, the sensor includes the conducting elements and at least one electrolyte bridge, with or without a substrate and deformable material, and is operable in "open air", or is adapted to be incorporated into another object (e.g., automobile car seat, etc). For example, the sensor may comprise the conducting elements and electrolyte bridges configured for placement into a device or article. The sensor may be manufactured in a first facility and then shipped (e.g., in packaging for shipment and storage) to a second facility for placement of the sensor in an article (e.g., automobile seat or golf club grip) for use. Thus, this article may include a component or components onto which the conducting elements, the electrolyte bridges, or both are placed, which act as a load receiving component. This article may also include a deformable component or components under which the conducting elements, the electrolyte bridges, or both are placed, which allows a pressure on such deformable component or components to be transferred to the electrolyte bridges.

In one embodiment, nanoscale fiber-filled polymer matrixes are used for sensing pressures. The nanoscale fibers described herein may be used with or incorporated into a variety of composite materials to form sensors. Representative examples of suitable composite materials may include polymers (e.g., ethylene-vinyl acetate copolymer), resins (e.g., diglycidyl ether of bisphenol F, modified bismaleimide resin (BMI), polyhedral oligomeric silsesquioxane (POSS) resin), polyacrylonitrile (PAN), polyvinylidene fluoride (PVDF), polycarbonate (PC), polyvinyl alcohol (PVA), ceramic-based carbon nanotube composites, or a combination thereof or any other materials which are compatible for use with nanoscale fibers and which may be deformed or flexed under the compressive force to be sensed or measured. In certain embodiments, the composite material comprises a flexible, deformable, resilient, or elastomeric film material.

Methods for Making the Sensors

Various methods for making the sensors may be used. In one embodiment, the method comprises disposing a plurality of conducting elements at positions spaced apart form each other and disposing a deformable electrolyte bridge onto the conducting elements at one or more contact points.

Figure 3:
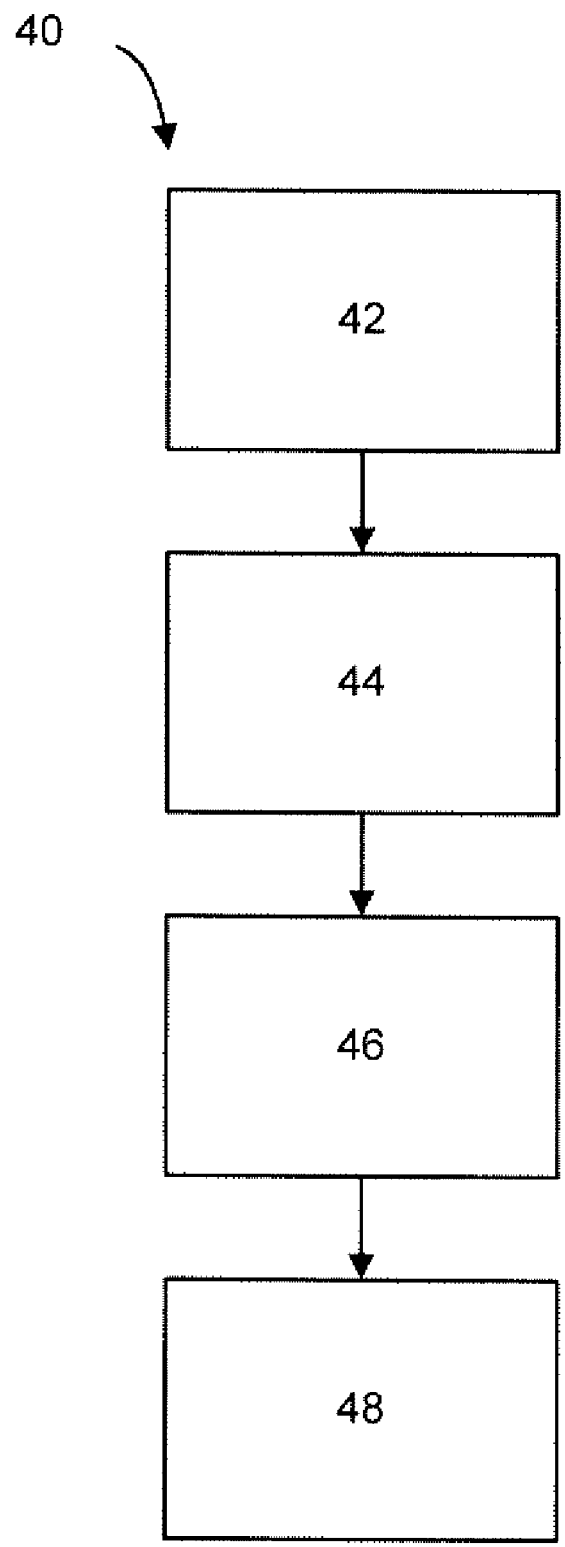
FIG. 3 is a process flow diagram illustrating one embodiment of a method for making a sensor.

In another embodiment, illustrated in FIG. 3, the method 40 comprises providing a substrate at step 42, disposing a first conducting element on a first surface of the substrate at step 44, disposing a second conducting element on the first surface of the substrate in a position spaced apart from the first conducting element at step 46, and disposing an electrolyte bridge onto the first conducting element at a number of first contact points having a first aggregate contact area and onto the second conducting element at a number of second contact points having a second aggregate contact area at step 48. The electrolyte bridge is separated from and distal to the substrate such that, upon application of an ionic circuit between the first conducting element and the second conducting element, a first resistivity between the first conducting element and the second conducting element exists. Upon application of a compressive force on the electrolyte bridge directed towards the first surface, the first aggregate contact area, the second aggregate area, or both increase such that a second resistivity between the first conducting element and the second conducting element exists.

In certain embodiments, conducting elements are disposed on a substrate as metal film, or metal coating, structures on a substrate. For example, a polymer substrate may include a metalized surface patterned into conducting elements spaced apart from each other. Other suitable means known in the art may be used to place or secure the conducting elements on the substrate.

In some embodiments, the method includes preparing a sensor using a stamp. In certain embodiments, the stamp is a PDMS stamp. Procedures for preparing a PDMS stamp for use in soft lithography are known (see e.g., Xia Y. and Whitesides, G. M., *Annu. Rev. Mater Sci.*, 28, 153 184, 1998). For example, a PDMS stamp may be prepared by the following steps: 1) pour a precursor of the PDMS elastomer mixed with curing agents over a master fabricated using photolithography or micromachining technique and having relief structure on its surface; 2) cure the precursor by heating it to an elevated temperature; and 3) release the cured PDMS stamp from the master.

Figure 4:
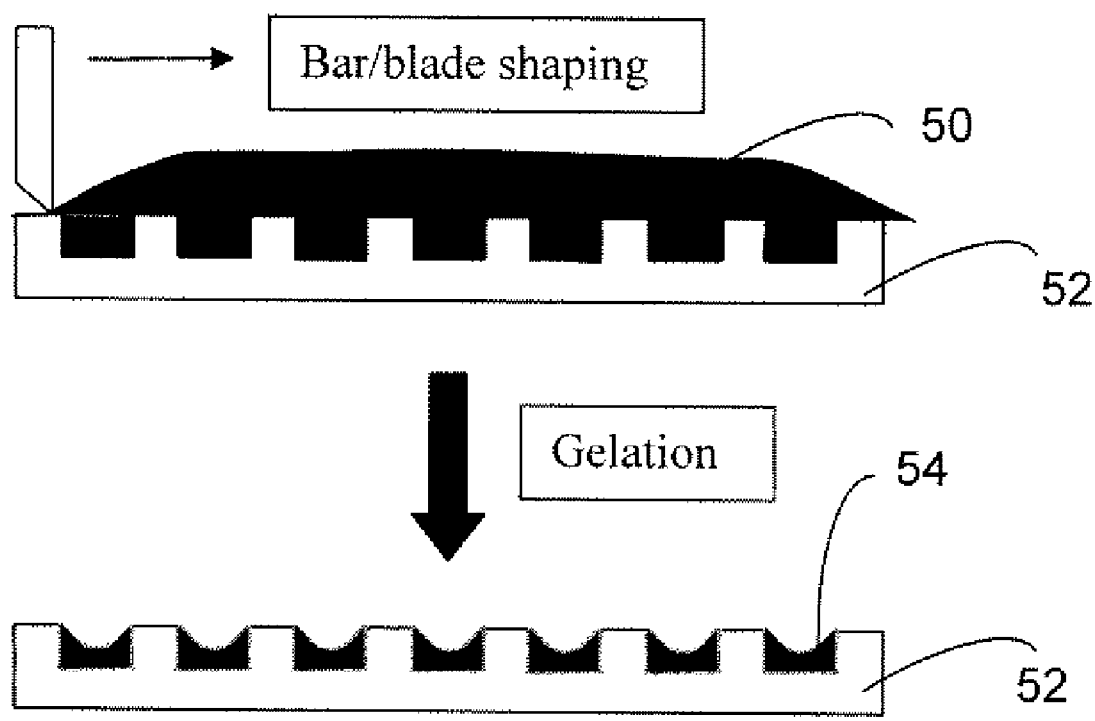
FIG. 4 illustrates the step of disposing deformable electrolyte bridges in accordance with one embodiment of the method for making a sensor.
Figure 5A:
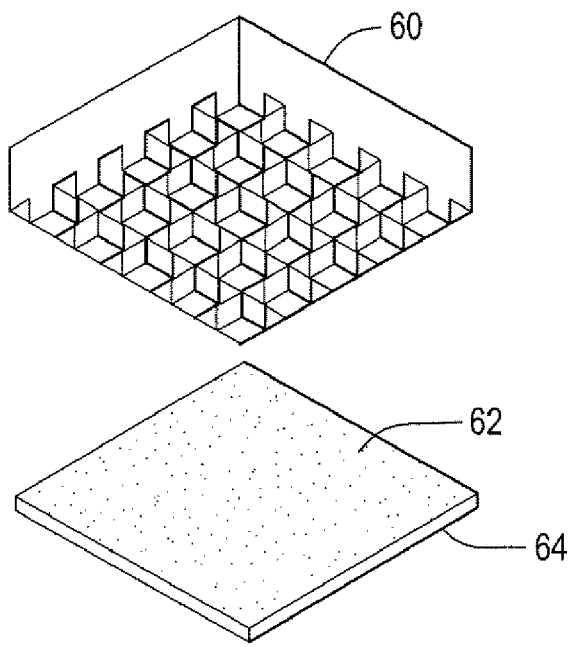
FIG. 5 illustrates the cutting and removing of conducting elements from a conducting material with a patterned stamp in accordance with one embodiment of the method for making a sensor.
Figure 5B:
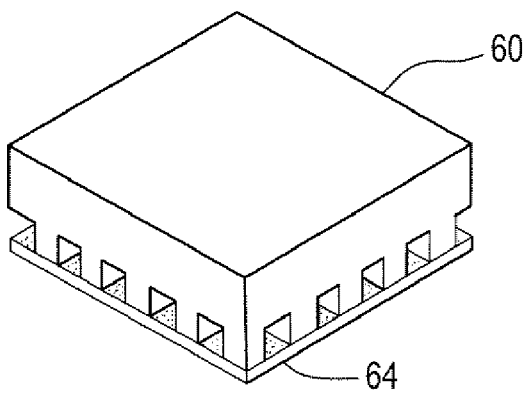
Figure 5C:
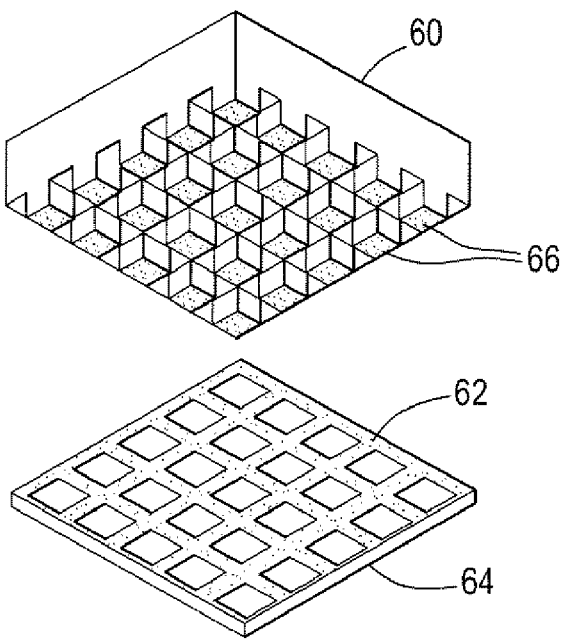
Figure 5D:
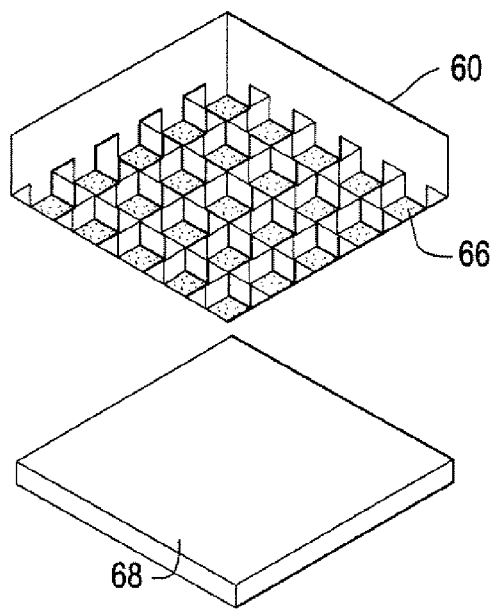
Figure 5E:
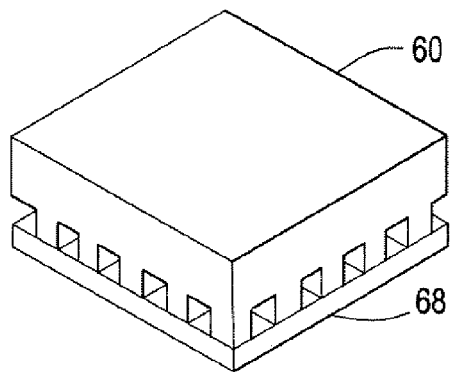
Figure 5F:
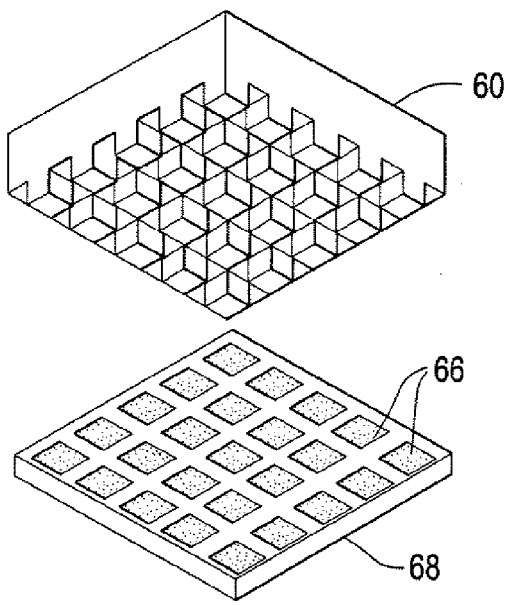

In one embodiment, the PDMS stamp is used to stamp an elastomer-like polymer deformable material to form grooves in the deformable material. As shown in FIG. 4, a polymer gel electrolyte or polymer electrolyte 50 is applied to the grooves of the deformable material 52 and then shaped (e.g., with a bar or blade) to form the top portion of the sensor including deformable electrolyte bridges 54.

Depending on the particular formulation of the polymer gel electrolyte bridges, the gelation process may be assisted by one or a combination of techniques such as solvent evaporation, thermal curing, and UV curing process. In one embodiment, UV radiation is applied through a mask with a pattern matching the stamped pattern of the elastomer polymer deformable material. Masked UV curing processes selectively cure the polymer electrolyte bridges in the grooves of the deformable material. If any polymer electrolyte bridge material remains on a region of the deformable material where it may be undesirable (e.g., for proper functioning of the sensor) to have the electrolyte bridge material, then the electrolyte material may be removed by a post cleaning process. For example, physical or chemical property differences between the material's cured and uncured states can be exploited.

A variety of techniques may be used for making surface patterning structures on plastic substrates. Examples include photolithography, microcontact printing, inkjet printing, and stamp transferring (see e.g., Zhou et al., *Appl. Phys. Let.*, 88 123109, 2006). In one example, carbon nanotube film conducting elements positioned in a pattern on a polymer substrate (i.e., the bottom element of a pressure sensor) may be prepared using a stamp transfer technique, as illustrated in FIG. 5. The pattern of the PDMS stamp 60 used for the conducting elements 66 of the sensor may be either the same as or different from the ones used for top portion of the sensor (i.e., for stamping the deformable material). In FIG. 5(*a*), a patterned PDMS stamp 60 and a carbon nanotube film 62 on a filter 64 are provided. The nanotube film 62 was formed by vacuum filtration of a suspension of nanotubes onto the filter 64. In FIG. 5(*b*), conformal contact between the PDMS stamp 60 and the nanotube film 62 on the filter 64 is achieved. In FIG. 5(*c*), the PDMS stamp 60 is removed from the filter 64. Thus, patterned nanotube film elements (i.e., conducting elements) 66 are transferred onto the PDMS stamp 60 without any damage to them. In FIG. 5(*d*) the PDMS stamp 60 with the conducting elements 66 and a flat receiving substrate (e.g. PET film) are provided. In FIG. 5(*e*), conformal contact between patterned nanotube films 66 on the PDMS stamp 60 and the substrate 68 is achieved. In FIG. 5(*f*), the PDMS stamp 60 is removed from the substrate 68 after mild heating and the conducing elements 66 on the stamp are transferred onto the substrate.

In other embodiments, a sensor is made by dispersing nanoscale fibers in a homogeneous mixture or heterogeneous mixture with a composite material such as a polymer. For example, the heterogeneous mixture with a composite material may be in a gradient structure. In one embodiment, the method comprises mixing carbon nanotubes with resins or resin solutions (e.g., for subsequent solvent casting, injection molding, or extrusion) and then curing or otherwise gelling or solidifying the resin, with the carbon nanotubes dispersed in the resin.

Nanoscale Fibers and Nanoscale Fiber Films

In certain embodiments, the sensors may include nanoscale fibers and nanoscale fiber films in their construction.

As used herein, the term "nanoscale fibers" refers to a thin, greatly elongated solid material, typically having a cross-section or diameter of less than 500 nm. In certain embodiments, the nanoscale fibers are single-walled carbon nanotubes (SWNTs), multiple-walled carbon nanotubes (MWNTs), carbon nanofibers (CNFs), or mixtures thereof. Carbon nanotubes and carbon nanofibers have high surface areas (e.g., about 1,300 $m^2/g$), which results in high conductivity and high multiple internal reflection. In a preferred embodiment, the nanoscale fibers comprise or consist of carbon nanotubes, including both SWNTs and MWNT. SWNTs typically have small diameters (~1-5 nm) and large aspect ratios, while MWNTs typically have large diameters (~5-200 nm) and small aspect ratios. CNFs are filamentous fibers resembling whiskers of multiple graphite sheets or MWNTs.

As used herein, the terms "carbon nanotube" and the shorthand "nanotube" refer to carbon fullerene, a synthetic graphite, which typically has a molecular weight between about 840 and greater than 10 million grams/mole. Carbon nanotubes are commercially available, for example, from Unidym Inc. (Houston, Tex. USA), or can be made using techniques known in the art.

The nanotubes optionally may be opened or chopped, for example, as described in U.S. Patent Application Publication No. 2006/0017191 A1.

The nanotube and nanofibers optionally may be chemically modified or coated with other materials to provide additional functions for the films produced. For example, in some embodiments, the carbon nanotubes and CNFs may be coated with metallic materials to enhance their conductivity.

As used herein, the term "nanoscale film" refers to thin, preformed sheets of well-controlled and dispersed porous networks of SWNTs, MWNTs, CNFs, or mixtures thereof. Films of carbon nanotubes and nanofibers, or buckypapers, are a potentially important material platform for many applications. Typically, the films are thin, preformed sheets of well-controlled and dispersed porous networks of SWNTs, MWNTs, carbon nanofibers CNFs, or mixtures thereof. The carbon nanotube and nanofiber film materials are flexible, light weight, and have mechanical, conductivity, and corrosion resistance properties desirable for numerous applications. The film form also makes nanoscale materials and their properties transferable to a macroscale material for ease of handling.

The nanoscale fiber films used in the sensors may be made by essentially any suitable process known in the art.

In some embodiments, the nanoscale fiber film materials are made by a method that includes the steps of (1) suspending SWNTs, MWNTs, and/or CNF in a liquid, and then (2) removing a portion of the liquid to form the film material. In one embodiment, all or a substantial portion of the liquid is removed. As seen herein, "a substantial portion" means more than 50%, typically more than 70, 80%, 90%, or 99% of the liquid. The step of removing the liquid may include a filtration process, vaporizing the liquid, or a combination thereof. For example, the liquid removal process may include, but is not limited to, evaporation (ambient temperature and pressure), drying, lyophilization, heating to vaporize, or using a vacuum.

The liquid includes a non-solvent, and optionally may include a surfactant (such as Triton X-100, Fisher Scientific Company, N.J.) to enhance dispersion and suspension stabilization. As used herein, the term "non-solvent" refers to liquid media that essentially are non-reactive with the nanotubes and in which the nanotubes are virtually insoluble. Examples of suitable non-solvent liquid media include water, and volatile organic liquids, such as acetone, ethanol, methanol, n-hexane, benzene, dimethyl formamide, chloroform, methylene chloride, acetone, or various oils. Low-boiling point liquids are typically preferred so that the liquid can be easily and quickly removed from the matrix material. In addition, low viscosity liquids can be used to form dense conducting networks in the nanoscale fiber films.

For example, the films may be made by dispersing nanotubes in water or a non-solvent to form suspensions and then filtering the suspensions to form the film materials. In one embodiment, the nanoscale fibers are dispersed in a low viscosity medium such as water or a low viscosity non-solvent to make a suspension and then the suspension is filtered to form dense conducting networks in thin films of SWNT, MWNT, CNF or their mixtures. Other suitable methods for producing nanoscale fiber film materials are disclosed in U.S. patent application Ser. No. 10/726,074, entitled "System and Method for Preparing Nanotube-based Composites;" U.S. Patent Application Publication No. 2008/0280115, entitled "Method for Fabricating Macroscale Films Comprising Multiple-Walled Nanotubes;" and U.S. Pat. No. 7,459,121 to Liang et al., which are incorporated herein by reference.

Additional examples of suitable methods for producing nanoscale fiber film materials are described in S. Wang, Z. Liang, B. Wang, and C. Zhang, "High-Strength and Multifunctional Macroscopic Fabric of Single-Walled Carbon Nanotubes," *Advanced Materials,* 19, 1257-61 (2007); Z. Wang, Z. Liang, B. Wang, C. Zhang and L. Kramer, "Processing and Property Investigation of Single-Walled Carbon Nanotube (SWNT) Buckypaper/Epoxy Resin Matrix Nanocomposites," *Composite, Part A: Applied Science and Manufacturing,* Vol. 35 (10), 1119-233 (2004); and S. Wang, Z. Liang, G. Pham, Y. Park, B. Wang, C. Zhang, L. Kramer, and P. Funchess, "Controlled Nanostructure and High Loading of Single-Walled Carbon Nanotubes Reinforced Polycarbonate Composite," *Nanotechnology,* Vol. 18, 095708 (2007).

In certain embodiments, the nanoscale fiber films are commercially available nanoscale fiber films. For example, the nanoscale fiber films may be preformed nanotube sheets made by depositing synthesized nanotubes into thin sheets (e.g., nanotube sheets from Nanocomp Technologies Inc., Concord, N.H.).

The nanotubes and CNFs may be randomly dispersed, or may be aligned, in the produced films. In one embodiment, the fabrication method further includes aligning the nanotubes in the nanoscale fiber film. For example, aligning the nanotubes may be accomplished using in situ filtration of the suspensions in high strength magnetic fields, as described for example, in U.S. Patent Application Publication No. 2005/0239948 to Haik et al. In various embodiments, good dispersion and alignment are realized in buckypapers materials, which assists the production of high nanoscale fiber content (i.e., greater than 20 wt. %) buckypaper for high performance composites materials.

In various embodiments, the films have an average thickness from about 5 to about 100 microns thick with a basis weight (i.e., area density) of about 20 $g/m^2$ to about 50 $g/m^2$.

The present sensors and methods can be further understood in view of the following non-limiting example.

A pressure sensor was prepared having the structure design as shown in FIG. 1, which is composed of a PDMS polymer elastomer deformable material, filled polymer gel electrolyte bridges, and conducting elements comprising metal coated structures on a surface of a polymer film substrate.

The polymer elastomer deformable material of the pressure sensor was made using Sylgard-184, a two-part poly(dimethyl siloxane) sealant provided by Dow Corning, Corp. Liquid mixtures of a Part A (vinyl terminated siloxane, 10 parts) and a Part B (H-silane, Pt catalyst, 1 parts) were manually stirred with glass rods, cast into an aluminum mold, and cured at 55° C. overnight to form the polymer elastomer deformable material of the pressure sensor.

The polymer gel electrolyte bridges were comprised of an ethylenimine (EI) oligomer mixture, poly(ethylene glycol diglycidyl ether) (PEGDE), lithium trifluoromethanesulfonate (LiTf), and dimehylformamide (DMF). All the chemicals were purchased from Sigma Aldrich and used without any further treatment. After dissolving 1 g EI oligomer in 2.366 g DMF, 0.123 g LiTf was added. This solution was then mixed with 1.382 g PEGDE and manually stirred for infiltration into the grooves of the PDMS elastomer deformable material. The PDMS elastomer deformable material filled with polymer gel electrolyte bridges was further subject to curing treatment at 70° C. for 4 to 5 hours.

To complete fabrication of the pressure sensor, a piece of metalized polyester (PET) Film (provided by McMaster-Carr) was adhered to the elevated part of the PDMS elastomer deformable material. The metalized film included silver conducting elements. The metalized side of the PET film was facing toward the polymer gel electrolyte bridges as in FIG. 1C.

Figure 6:
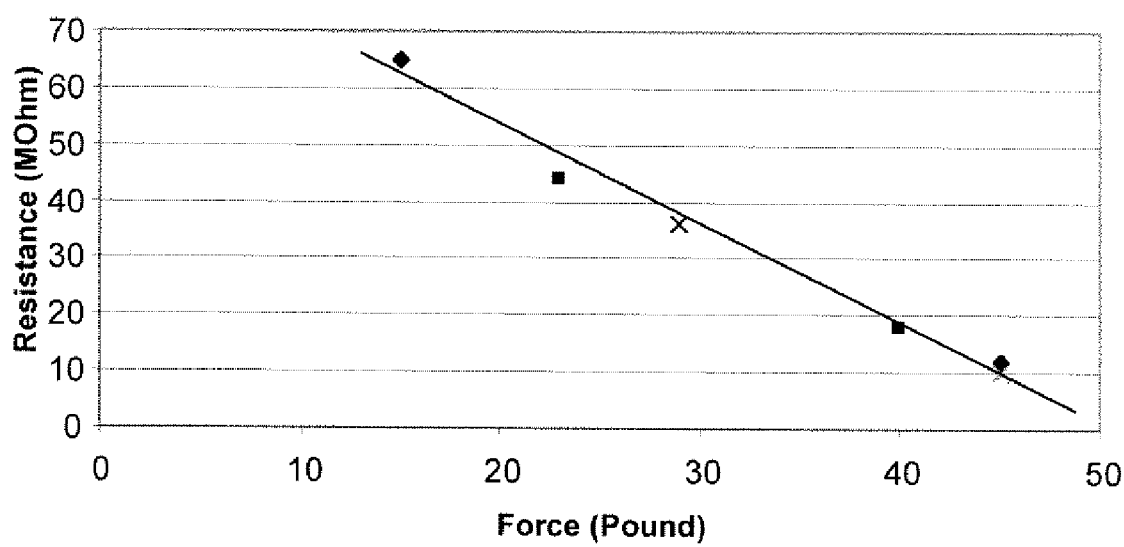
FIG. 6 is a graph showing representative sensing behavior of one embodiment of a pressure sensor made in Example 1.

FIG. 6 shows representative sensing behavior of the pressure sensor. Linearity was observed.

Publications cited herein and the material for which they are cited are specifically incorporated by reference. Modifications and variations of the methods and devices described herein will be obvious to those skilled in the art from the foregoing detailed description. Such modifications and variations are intended to come within the scope of the appended claims.

We claim:

1. A thin film sensor for measuring pressure or mechanical displacement comprising:
   a first substrate having a load receiving side and an opposed conducting element side;
   a plurality of conducting elements located on the first substrate at the conducting element side in positions spaced apart from one another;
   a deformable second substrate located on the conducting element side of the first substrate; and
   at least one deformable electrolyte bridge located on the deformable second substrate and contacting each of the conducting elements at one or more contact points, said contact points having an aggregate contact area,
   wherein, upon formation of an ionic circuit between two of the conducting elements, a first resistivity exists between said two conducting elements when the first substrate is in an unloaded state at a location at or about said two conducting elements, and a second resistivity exists between said two conducting elements when the first substrate is in a loaded state at said location and the at least one deformable electrolyte bridge is deformed at or about said location in an amount to increase the aggregate contact area.

2. The sensor of claim 1, further comprising means for forming an ionic circuit between two of the conducting elements.

3. The sensor of claim 1, wherein the conducting elements are elongated and parallel to one another.

4. The sensor of claim 1, wherein the conducting elements comprise nanoscale fibers.

5. The sensor of claim 1, wherein the conducting elements comprise nanoscale fiber films.

6. The sensor of claim 1, wherein the at least one deformable electrolyte bridge is elastically deformable.

7. The sensor of claim 1, wherein the first substrate comprises a polymer and the conducting elements comprise metalized structures disposed on the first substrate.

8. A thin film sensor comprising:
a plurality of conducting elements spaced apart from each other; and
at least one deformable electrolyte bridge contacting each of the conducting elements at one or more contact points having an aggregate contact area such that upon formation of an ionic circuit between two of the conducting elements, a first resistivity between the two conducting element exists, and upon application of a compressive force on the at least one deformable electrolyte bridge directed toward at least one of the conducting elements, the aggregate contact area increases such that a second resistivity between the two conducting elements exists.

9. The sensor of claim 8, further comprising means for forming an ionic circuit between two of the conducting elements.

10. The sensor of claim 8, wherein the conducting elements comprise nanoscale fibers.

11. The sensor of claim 8, wherein the conducting elements comprise nanoscale fiber films.

12. The sensor of claim 8, wherein the at least one deformable electrolyte bridge is elastically deformable.

13. The sensor of claim 8, wherein the at least one deformable electrolyte bridge comprises an arched surface having arch ends contacting each of the conducting elements such that an upper portion of the arched surface is spaced apart from the conducting elements, and wherein upon application of the compressive force, the upper portion of the arched surface contacts at least one of the conducting elements.

14. The sensor of claim 8, wherein the conducting elements comprise a plurality of conducting element strips positioned parallel to each other, and wherein the at least one deformable electrolyte bridge comprises a plurality of deformable electrolyte bridges positioned parallel to each other and traverse to the conducting element strips.

15. The sensor of claim 8, further comprising a substrate adjacent to the conducting elements, wherein the substrate is spaced apart from the at least one deformable electrolyte bridge.

16. The sensor of claim 14, wherein the substrate comprises a polymer and the conducting elements comprise metalized structures disposed on the substrate.

17. The sensor of claim 1, further comprising a deformable material adjacent to the conducting elements, the at least one deformable electrolyte bridge, or both.

18. The sensor of claim 16, wherein the at least one deformable electrolyte bridge comprises a polyacrylate salt.

19. A method for making a sensor comprising:
disposing a plurality of conducting elements at positions spaced apart from each other; and
disposing at least one deformable electrolyte bridge onto the conducting elements at one or more contact points having an aggregate contact area such that upon formation of an ionic circuit between two of the conducting elements, a first resistivity between the two conducting element exists, and upon application of a compressive force on the at least one deformable electrolyte bridge directed toward at least one of the conducting elements, the aggregate contact area increases such that a second resistivity between the two conducting elements exists.

20. The method of claim 19, wherein the conducting elements comprise nanoscale fibers or nanoscale fiber films.

21. The method of claim 19, wherein the conducting elements are provided by cutting and removing the conducting elements from a conducting material with a patterned stamp.

22. The method of claim 19, further comprising disposing a deformable material on the conducting elements, the electrolyte bridges, or both.

23. The method of claim 22, wherein the steps of disposing the at least one deformable electrolyte bridge and disposing the deformable material comprise providing a deformable material including grooves, disposing a plurality of deformable electrolyte bridges in the grooves, and disposing the deformable material with the deformable electrolyte bridges in the grooves onto the conducting elements.

24. A method of sensing a pressure differential comprising:
locating a sensor at a site where it is desired to sense a pressure change, the sensor comprising a plurality of conducting elements spaced apart from each other and at least one deformable electrolyte bridge contacting each of the conducting elements at one or more contact points having an aggregate contact area;
forming of an ionic circuit between two of the conducting elements;
measuring a first resistivity between the two conducting elements;
upon application of a compressive force on the at least one deformable electrolyte bridge directed toward at least one of the conducting elements to cause a change in the aggregate contact area, measuring a second resistivity between the two conducting elements; and
comparing the first and second resistivity to identify a pressure or pressure change at the site.

* * * * *